United States Patent Office 3,058,931
Patented Oct. 16, 1962

---

3,058,931
MULTICOLOR COATING COMPOSITION AND
METHOD FOR PREPARATION THEREOF
John L. Petty, Chicago, Ill., assignor to The Sherwin-Williams Company, Cleveland, Ohio, a corporation of Ohio
No Drawing. Filed Apr. 21, 1958, Ser. No. 729,513
30 Claims. (Cl. 260—17)

This invention relates to multicolor coating compositions and the method for preparing same.

More particularly, this invention provides an improved mottled point composition which will, upon single pass application of a spray gun, provide a continuous colored base coat appearing to be interspersed with a plurality of visibly discrete particles of different colors, from that of the base coat.

The invention comprises a paint latex emulsion which is normally pigmented containing microscopically dispersed interpolymers from ethylenically unsaturated monomers which as formulated are preferably, but not essentially, capable of depositing continuous films. Dispersed in visibly discrete macroscopic particles in the latex paint carrier is still another liquid phase which is immiscible with and non-emulsifiable in the emulsion paint latex system. The macroscopic phase is formulated generally to be of differing hue, value, and chroma over the pigmented latex emulsion paint which serves as a suspension medium for the macroscopically dispersed particles or globules. Upon application to surfaces in films, the product of this invention provides a base coat originating primarily from the microscopic particle-containing latex emulsion phase of one color and interspersed throughout the base coat are a plurality of the macroscopic globules or particles of the second liquid paint system of distinct and different physical properties from that of the first or emulsion system.

This invention is bottomed upon, and an improvement over, the pioneer advance in the protective and decorative coatings art described in U.S. Patent No. 2,091,466 of Busch. The compositions of Busch, when deposited in a film, provide a heterogeneous coating characterized by a plurality of discrete macroscopic droplets of color which, by the nature of the composition itself and its method of application, are juxtaposed, to produce in a single coating of material, a multicolor coating composition over a previously applied base coat. Thus, Busch provided a multicolor suspension coating which, except under very special circumstances, required a two coat application. Other more recent patents relating to suspension coatings of a multicolor nature are likewise limited and require, practically, a first base coat application and the second coat in a second application. Included are U.S. 2,591,904; 2,658,002; 2,795,562 and 2,809,119. British Patents 182,163 of 1922 and 628,131 of 1949 also relate to the subject of this invention and suspension coatings generally.

In use of compositions of the prior art it is customary to mask such portions of an area to be coated as is desired to be kept free of coating and to follow by spraying the unmasked portion of the area with a solid base color coating material (not a multicolor coating) in order to provide a continuous film or coating over the entire area to be protected and decorated. The first coat provides a substrate for the subsequently applied multicolor finish. The second coat of material applied has the general nature and composition as described in the prior art patents.

It is the principal object of this invention to provide a multicolored coating composition having all the advantages of the prior art plus the additional advantage of elimination of separate application of a continuous base or substrate color coating.

More specifically, it is an object of this invention to provide a multicolor coating composition which comprises in combination a dilute aqueous solution of a protective colloid as the continuous aqueous phase, a disperse phase comprising microscopically suspended particles of pigment and a paint latex emulsion polymer, and macroscopically suspended in said latex paint discrete particles of at least one component comprising a viscid liquid hydrophobe coating composition, usually of varying hue, value and chroma, the vehicle solids component of which is of such physical nature as to remain in macroscopic suspension in the aqueous latex paint suspension in which it is incorporated without deterioration in particle size.

It is a further object of this invention to provide a method of preparing a multicolor coating composition capable of spray application to provide, in one pass, a continuous base color (substrate) coating appearing to have interspersed therein a plurality of visibly discrete globules, which method comprises dispersing a pigment in water, stabilizing the water-pigment dispersion with a water dispersible hydrophilic protective colloid, fortifying the aqueous phase thereof by the addition thereto of an emulsion polymer paint latex, and while slowly stirring the aforesaid microscopic aqueous dispersion, separately incorporating therein, in discrete order, at least one and preferably, a plurality of visibly separate globules of a hydrophobic pigmented liquid coating composition, the vehicle solids of which are characterized by their physical property of non-emulsifiability in the system and which remain in suspension in visible macroscopic particles in said aqueous carrier system.

It is a further primary object of this invention to provide an improvement over the prior art, which permits ready application of a multicolored mottled paint composition and a corresponding solid colored substrate or base coating therewith by single pass of a spray gun.

These and other objects of the invention will be more fully developed as the description of the invention proceeds.

The art of reference discloses that one may produce a multicolor coating composition by first preparing a dilute solution of an aqueous protective colloid and slowly stirring into the prepared aqueous solution, sequentially and in discrete fashion, a plurality of relatively heavy-bodied colored coating compositions of generally hydrophobic nature, including paints, varnishes, lacquers and enamels and these non-selectively.

In the prior art, multicolor compositions one may use colored enamels, lacquers, etc., as they are sold through retail establishments, and by adding these separately with slow agitation to aqueous systems containing dispersed therein a wide variety of protective colloids, it is possible to produce a liquid material which can be applied by spray gun to deposit in macroscopic form, globules of the various colored paints which, because of the protective colloid in the aqueous phase, do not blend with one another.

In the prior art coatings, as described and identified above, it is mandatory to avoid the presence of surface active agents. Avoidance of surface active agents is essential as their presence would cause a breakdown in particle size of the macroscopically suspended paint coatings to microscopic dimension (form an emulsion) and thereafter the resultant coating composition would perform similar to a resin-emulsion paint.

Latex emulsion paints, as known, all contain surface active agents which are essential to the end of manufacture, storage and use of these products. If one attempts to disperse the liquid macroscopic particles of vehicles as used in prior art suspension paints in aqueous suspension in accordance with the present invention, the macroscopic particles or globules break down in size and emulsify when the coating is vigorously agitated, as usual in manufacture, or in application of paint by means of spray gun techniques. Thus non-selectively, paints, varnishes, enamels and lacquers operatively useful in the prior art are inoperable for purposes of the present invention.

The one-coat multicolor coating compositions of this invention are prepared in general as follows: An aqueous solution of a protective colloid is prepared by dispersing from about one-half to less than about 20% of a protective colloid in water. The amount depends upon the protective colloid selected. As is standard practice small amounts of preservatives, illustratively the alkali metal salts of polychlorinated phenols are dissolved in the aqueous protective colloid solution. Pigments essential to hiding quality and to gloss level control in the final product are dispersed in water or in the aqueous protective colloid solution by initial mixing and later subjecting to a zone of high shearing stress as may be provided by a Cowles dissolver, pebble-mill, Hy-R-Speed Mill, Premier Colloid Mill or other equivalent shearing device used in pigment dispersion. If not previously combined, the dispersed pigment slurry and aqueous colloid dispersion are combined. The quality and amount of pigment present may be varied widely, or may in some unusual cases be omitted entirely. The amount and kind of pigment will vary depending upon the hiding quality of the particular pigment chosen, the shade or depth of color and the degree or quality of gloss wanted. These are factors understood by those skilled in the paint art.

To this slurry is added a quantity of an emulsion interpolymer, preferably an interpolymer of ethylenically unsaturated monomers polymerized in an emulsion system as are commonly sold commercially for use in the manufacture of latex emulsion paints. The emulsion polymer particles are of microscopic particle size and the emulsions of the class of interest are herein referred to from time to time as paint latices or paint latexes. It is preferred to use a copolymer of an aromatic monovinyl hydrocarbon having a single center of unsaturation and an aliphatic conjugated diolefine, wherein the proportions of the monovinyl hydrocarbon do not exceed 67 mol percent and the diolefine does not exceed 60 mol percent as the ethylenically unsaturated monomers in the paint latex emulsion. Present preference is not, however, to be construed as limiting. Other emulsion interpolymer latices are being continuously introduced for paint-making purposes and substitution of latex emulsions which are substantially equivalent is anticipated. Other paint latices may be substituted therefore, as will be discussed herein more fully, and are substantial equivalents to the paint latex named as far as operativeness of the invention is concerned. Obviously, some paint latices are more useful than others for reasons having no relation to the present invention.

It is well known that emulsion interpolymers of ethylenically unsaturated monomers are usually manufactured by emulsion polymerization in an aqueous system containing protective colloids, free-radical catalysts and normally surface active agents of non-ionic or anionic character. Surface active agents normally present in paint latex emulsion interpolymers in the quantities normally and inherently present in the latex emulsion systems may be carried into the paint systems which constitute this invention without difficulty. The small amounts of surface active agents thus carried in do not interfere with the general objects of the invention. From time to time it may be found desirable, when the combination of ingredients produce paints within the purview of this invention and which lack the requisite emulsion stability, which sometimes occurs with certain pigments when in combination with particular emulsion copolymer paint latex systems, a small amount of a non-ionic polyoxy alkylene polyether alcohol surface active agent, may be added to the system and is often salutary.

Compounds known to cause particular difficulty when present as contaminants or included for one reason or another in one or more of the essential components of the invention, are the polyphosphate salts. Illustratively, sodium hexametaphosphate, potassium tetrapyrophosphate, sodium sulphate and other strongly ionizable inorganic salts are the worst offenders and should be completely avoided wherever possible.

The pigmented varnish vehicles used to form the macroscopic phase are limited to those varnish vehicles whose vehicle solids and whose organic solvent reduced vehicle solids or final varnish can be identified as having at least one HN value below 60. The pigmented macroscopic phase is prepared by grinding colored pigments into the varnish vehicle by the usual paint techniques. It is customary and usual that the vehicle solids of varnishes having the proper HN requirement be reduced with volatile organic solvents in order that handling may be made easier. Where possible it is referred to use aliphatic solvents as it has been found that the nature of the solvent has some effect upon the cleanliness and brilliance of the macroscopic globule of vari-colored components in the dried film. Aliphatic solvents are more favorable to a clean and unsullied macroscopic phase particle than when aromatic solvents are present. The use of aliphatic solvents has been found to provide greater latitude in the selection of protective colloids incorporated into the overall paint system. When aliphatic solvents are used in thinning the varnish solids, there is no need for selectivity from among all of the known protective colloids, representative ones of which have been tested. If one finds it essential to use aromatic solvents, illustratively toluene and xylene, as is necessary in reducing certain qualities of varnish solids, illustratively varnishes of the glycidyl ether type, then in those cases it is preferred to use the water soluble cellulose ethers as the protective colloid. It has been found by following this practice that no difficulty is then experienced with clouding of the spatter color or macroscopic globules of vari-colored material in the final paint film. It has been found that solvent selection is of material significance or the dispersed macroscopic pattern tends to be overgrown with the pigmented base emulsion latex material. Aromatic solvents have also been found to be generally detrimental to the freeze-thaw resistance of the suspension paints of this invention when stored in unheated warehouses. Comparative tests have shown aliphatic solvents also superior for the purposes of resistance to freeze-thaw breakdown as compared with the aromatic solvents under similar test conditions.

Driers and drying promoters, anti-skinning agents and others commonly used in the paint art may also be added to the liquid macroscopic phase either before or after grinding in the pigments as is well known in the paint art. It is preferred to maintain the solids and the viscosity of the macroscopic phase of the paint system of this invention at relatively high levels. By so doing the final coatings are obtained having a more pleasing optical response. If the macroscopic phase varnish vehicle is overly thin (e.g. too much volatile solvent or not of sufficient viscosity) the plural colored pattern is apt to diminish in particle size and to be so fine as to lack character.

The aqueous slurry comprising the latex emulsion, pigment and protective colloid as prepared above is slowly agitated while measured amounts of the pigment-varnish system of hydrophobic nature as prepared are stirred, in sequence and one at a time in discrete order, into the aqueous latex emulsion paint system under agitation. Colors may also be boxed after suspension in water, as is known, before addition.

One color may be used, or a series of colors to furnish a plurality of macroscopic, discrete hydrophobic particles of liquid color suspended in the aqueous base. Alternatively, separate portions of the aqueous emulsion base may be measured out, each mixed with a single addition of the macroscopic hydrophobe particles of liquid color, and after stirring each one to a desired particle size, the individual ones of the prepared suspension may be boxed together to produce an infinite variety of color effects.

As can be seen from the above description, improved multicolor coating compositions are produced with relative simplicity. Quantities of the essential components can be mixed in a wide variety of proportions. The quantities of the various components are not particularly critical, due regard being shown the general qualities essential to an operable paint system such as viscosity, weight per gallon, density, etc., commonly known to be of importance in the paint art and which qualities are apparent especially to one skilled in the emulsion paint-making field. There has been described above, generally, a method of manufacture of improved mottled coating compositions which dispenses with the necessity of separate application of a base color coat.

Having thus described the method of reduction to practice of the invention in general, detailed attention will be given to the question of differentiation between operable and inoperable components within the framework of the descriptive term used and the question of substantial equivalency among the sub-classes of those classes of viscid hydrophobic varnish materials which are essential to the ends of this invention.

THE HYDROPHOBIC VARNISH PHASE

In the greatest measure this invention rests upon the discovery that drying oils and varnishes in common use in the protective coatings field vary within extremely wide limits as to a physical quality, herein referred to as the Hydrophile-Lipophile Balance or HLB; or Hydrophilic Number or HN. It has been found to be possible by careful attention to this little known quality to avail oneself of varnishes which will not emulsify in aqueous emulsions of ethylenically unsaturated monomers in polymeric form as does occur with other varnishes which may be of apparently similar chemical origin but of different physical-chemical surface properties.

Through discovery of the existance of varnishes which will not emulsify in latex paint systems, it is now made possible to produce a hybrid coating having all the advantage of the popular latex paints, namely; ease of application, high-hiding quality, freedom from fire hazard and pleasing pastel colors at minimum costs plus the tremendously wide variation in color combinations and optical differences potential in the suspension systems as derive from Busch in a coating composition which can be applied to surface with the further economy of but a single coat application.

As indicated, the most important element of the present invention is the suspension varnish vehicle. Useful varnish vehicles are identified and separated from all non-useful varnish vehicles by a particular physical quality which is referred to as the Hydrophilic Number requirement or briefly, HN requirement. The same quality is also identifiable by a mathematically related concept which is referred to as the Hydrophile-Lipophile-Balance or HLB requirement of the vehicle. Workers in the field correlate these two concepts for most practical purposes in accordance with the following simple equation: $HN = 5HLB$.

For those who wish to review the subject of this physical quality and for purposes of illustration and clarification, the following articles are included herein by reference the same as though they were set forth herein in their entirety.

(1) "Classification of Surface Active Agents," volume 1, No. 5, December 1949, and (2) "Calculation of HLB Values of Non-Ionic Surfactants," volume 5, No. 4, December 1954.

These first two articles are found in issues of the Journal of the Society of Cosmetic Chemists in articles by Wm. C. Griffin.

(3) "Clues to Surfactant Selection Offered by the HLB System," Official Digest of the Federation of Paint and Varnish Production Clubs, June 1956, by the same author.

(4) The commercial booklet entitled "Igepals," published by Antara Chemicals, 435 Hudson Street, New York 14, N.Y., in March 1954.

The experimental method for determining the HLB requirements, or HN requirements, of a given hydrophobe are described in the references above. However, a short description of the method for its determination follows, using the symbols HN to identify the concept.

To determine the HN value of a varnish hydrophobe one may wish to employ in the compositions of this invention, the following procedure is suggested. The varnish (resin or oil) phase solids to be evaluated for suitability as a component of the macroscopic phase of the coating system is diluted with a suitable volatile organic solvent whose HN value is known or has been determined by a similar test to the one which follows. The percentage of vehicle solids and volatile solvent is recorded. A series of tall slender bottles (olive jars will do) are lined up and 48 grams of the prepared oil phase of unknown HN are weighed into each jar. Three grams of each one of a series of non-ionic surfactants of varying and known HN value are individually weighed into separate ones of the test jars and the HN value of the surfactant weighed and recorded on the jar corresponding. The emulsifiers are stirred into the hydrophobe and 72 grams of water added to each specimen. The jars are shaken vigorously and uniformly for thirty seconds and allowed to rest for 5 minutes, whereupon the shaking is repeated for several 30 second intervals. If after 24 hours rest it is not clear which HN number applies to the vehicle (by selection of the best emulsion among the series) the samples are re-shaken and a week is allowed to elapse. Usually this time is sufficient to indicate the HN value of the mixture of hydrophobe solids and volatile organic solvent therefor. This value is noted. In more accurate determinations in close or stubborn cases where phase resolution is slow the test may be carried on over a month or more period.

The HN requirements of the hydrophobe solids are determined by simple calculation in accordance with the following. Assume that xylene was used as the solvent (HN of xylene=57) to produce a 50% vehicle solids solution of the test resin. An HN value of a typical test HN requirement of a useful varnish hydrophobe for the present purpose was found to be 54. If X is equal to the HN of the hydrophobe oil solids, Y is equal to the HN of the solvent and Z is equal to the HN of the resin-solvent mixture; the following equation can be set up:

$$(\% \text{ solvent})(Z-Y) = (\% \text{ vehicle solids})(X-Z)$$

Substituting values for letters:

$$50\%(54-57) = (50\%)(X-54)$$
$$-150 = 50X - 2700$$
$$50X = \frac{150}{2550}$$

$$X = 51$$

Briefly stated the HLB or HN value is "an expression of the relative simultaneous attraction of an emulsifier for water and for oil (or for the two phases of a system to be emulsified) . . . For purposes of convenience the effective balance of these two groups is assigned a numerical value." Under the HLB system of nomenclature those surfactants most lipophilic (or attracted to oil) are given low numbers and those attracted strongly to water are assigned progressively high numbers. The numerical values range from one to forty with 10 being a practical mid-point of the range. Another group, concerned with non-ionic surfactants have adopted the term Hydrophilic Number, or HN to the concept. The HN value in early work was determined to be equivalent to the weight percentage of ethylene oxide groups in the total non-ionic molecule. This has been established only for non-ionic agents having an alkyl phenol nucleus. Thus, non-ionic surface active agents having an alkyl substituted phenol nucleus, an HN of 50 (HLB of 10) has 50% of ethylene oxide groups by weight in the total molecular weight of the surfactant.

Further experience with assignment of numerical physical constants to emulsifiers has established that these values are not limited to ethylene oxide containing surfactants, nor to any particular chemical class of emulsifiers but can be assigned to anionic surfactants as well. For example, the well-known sodium salt of dioctyl ester of sulfosuccinic acid (Aerosol "OT") has been demonstrated to have a very high Hydrophilic Number. Part of the higher values attributed to this class is believed due to their ionic nature. Indications are that the cationic agents are also of very high HN.

A further useful extension of the physical constant referred to herein as Hydrophilic Number or HN is that such number may be assigned equally as well to hydrophobe substances which form the oil phase of emulsion systems. Thus, the oil phase of an emulsion system may be said to have an HN requirement of 20, 32, 50 or 85 as illustrative of a common numerical range. The HN requirement may be different for the same vehicle depending upon the type of emulsion one wishes to produce, e.g. whether oil-in-water or water-in-oil emulsions are desired.

In this specification, by election, reference is to the HN requirement for oil-in-water emulsification. This invention is not primarily concerned with the production of emulsions, although a paint latex emulsion system is an essential component of the coating compositions herein described and claimed. It has been found that the essential hydrophobe component of the invention can be accurately defined by HN requirement, the physical constant described above and which is applicable to varnishes in general use.

From the above it is believed clear the meaning of the term HN requirement and the fact that the numerical designation of a varnish vehicle as a particular HN has relation to a physical property identifying the surface characteristics of varnish vehicles.

In the parent application, U.S. Serial No. 538,283, filed October 3, 1955, now abandoned, and from the data then available it was believed only vehicles having an HN in excess of 105 were useful. The species of varnish vehicles first used in reduction to practice of the invention and for the present invention were of the class commonly referred to as "epoxides" or more completely identified as glycidyl polyethers of dihydric phenols, free from functional groups other than epoxy and hydroxyl groups, having an epoxy equivalent greater than one when calculated on a 100% solids basis; and the drying oil fatty acid esters of these epoxide vehicles. Original HN determinations indicated that these vehicles had values above 105 and the varnish vehicles so described were determined to be in the 110 to 130 range of HN value.

In subsequent determinations of the HN of several of these epoxy resin varnishes, as well as additional varnish vehicles it was found that the higher values of HN were not as clear and definite over longer test periods and under more accurate tests as a second value of HN found for these vehicles which existed in a range of 50–55. These markedly different secondary values were originally observed in testing the epoxide varnishes which checked out in the original range of HN value namely from 110 to 130. Re-checking of the determinations after several weeks additional test time of storage verified the values in the lower range were of greater accuracy than the higher values and of more certain reproducibility.

In order to provide this disclosure and application with further examples of operable vehicles having HN values within the operable range, a representative group of varnish vehicles from those in production and commercial use were obtained. The Hydrophile Number of the solvents used with those varnish vehicles was known as well as the percentage of non-volatile vehicle solids used to make the varnishes was also known. The HN numbers of this representative group of varnishes was then determined, based on 100% varnish vehicle solids content. This same group of varnishes were used in trials to determine their operability in the products herein described. There was complete substantiation of the concept that the HN value of the varnish solids defined operable species from those which were inoperable. It was also established that no known method of definition by chemical compositions separated the known operable varnish systems from the known inoperable varnish systems. The useful varnishes, their composition and manufacture are described more fully in the examples which follow. It was found that above an HN of 59, as shown in Example Vehicle #24, a definitely borderline varnish vehicle would be obtained (unless a second HN requirement of the varnish vehicle exceeded 110). All varnish vehicles having one HN below 59 and those showing a secondary value above 110 were operable. Varnish vehicles having but a single determinable HN value in the range of 104–106 were found to be inoperable for the purposes of the invention. There were no varnishes, other than the epoxide varnishes, found having the high HN value above 110 in the great number tested. Useful varnish vehicles solids having an HN value of less than 59 and down to a value of 26 (the lowest value found) were tested in formulations and all were operable for the purposes of the invention. A range of HN from 50 to 58 was preferred and encompassed the most useful varnish vehicles those varnishes whose HN could be determined.

As far as is known, there is no problem involved in changing of the vehicle solids content of the varnishes useful for the purposes of the present invention. Changes are made in the solids content of the varnishes by adding or withholding solvent. Most, if not all, of the volatile organic solvents standardly used to thin varnish solids to a required viscosity level have HN requirements of below 59. Thus, if the vehicle solids have an HN requirement below 59 and the solvent is also of HN requirement below 59, changing the percentage of vehicle solids will not adversely change the HN requirement of the resultant vehicle. Varnish vehicle as used herein may, therefore, be at any solids level desired so long as the HN requirement of the solvent reduced varnish is below about 60.

Of all the varnish vehicles subjected to evaluation from commercially available sources only two were indeterminate in relation to HN value. Of these, one was a black asphaltum varnish, which because of the color, could only be estimated as to HN value. The asphaltum material was estimated to possess an HN requirement of 26, which was the lowest of all vehicles subjected to HN determination, and upon check out at this value good emulsion products were obtained confirming the estimated value to be accurate.

The second vehicle which was found particularly useful for the purposes of the invention but which was indeterminate as to its HN requirement is a polyamide resin of strongly thixotropic physical nature having a gel-like physical structure. This varnish is often referred to in the paint art as a "Burnok" or "Washburn" vehicle. Because of the unusual physical nature of this varnish vehicle it is well known in the art and is of a highly specialized class. The polyamide resin of indeterminate HN requirement is more fully described in the Winkler patent, U.S. 2,663,649, and an essential component thereof is described in U.S. 2,450,940, both of which patents are incorporated herein by reference.

The "Burnok" or "Washburn" varnish vehicle is of indeterminate Hydrophile Number or HN and found to be very useful in the invention is not classifiable in accordance with its HN value as are all the other operable varnish vehicles useful in the compositions of this invention. Oddly enough, considering the nature of the "Burnok" varnish it is mineral spirits soluble. It is one of the few vehicles known among the polyamide class to be soluble in mineral spirits and the only well-known vehicle having extremely marked thixotropic quality. A great number of attempts to determine the HN number of this vehicle have proved inconclusive. It has been found to be indeterminant as to its HN number, that is, the HN number could not be determined by the tests applicable to other varnishes.

The Winkler or "Burnok" polyamide resins are, in turn, prepared by reaction of the polyamide resins of Cowan et al., described in U.S. Patent 2,450,940 of October 12, 1948, with modified solvent soluble oleoresinous varnish esters.

Oleoresinous varnishes, as the term is used herein, include those defined by Mattiello, volume 3, pages 194 and 195, and the members of the class as defined on page 195. All comprise the unsaturated drying oil fatty acid esters of polyhydric alcohols, some of which contain in addition dicarboxylic acids to form complex polyesters.

For the purposes of identification, the Winkler polyamide resins may be referred to as mineral spirits soluble fatty acid oleoresinous varnish ester-polyamide condensation of molecular weight between 3000 and 9000. This language is herein intended to identify the solvent dispersible polyamides corresponding to those described and claimed in U.S. 2,663,649.

A more complete but lengthy definition in essence synonomous with the above is "a mineral spirits soluble polyamide resin which polyamide resin is the reaction product of polymerized unsaturated fatty acids with an alkylene polyamine having two to four amine substituents and the interesterification product of an oleoresinous ester varnish comprising the condensation of an unsaturated fatty acid, a polycarboxylic acid and a polyhydric alcohol, the said interpolymer reaction completed at a temperature above the melting point of said polyamide resin but below 600 F. of molecular weight between 3000 and 9000." Manufacture and use of a varnish vehicle of this class is also illustrated in the illustrative examples which follow.

THE PROTECTIVE COLLOID

A second essential component of the present invention is the protective colloid. While it is preferred to use one of the water soluble alkyl cellulose ethers as the protective colloid, as the members of this group allow maximum freedom in formulation in suspension paints within the scope of the present invention in general, all the commonly used protective colloids may be successfully employed with due care for other factors being exercised as noted more fully herein.

The term protective colloid is a well understood term of art. In general, protective colloids used in aqueous emulsion systems are identifiable by their physical colloidal behavior rather than their chemical nature. In general protective colloids are known to increase the viscosity of aqueous systems in which they are dispersed in disproportionately great amount relative to the quantity of the colloid dispersed in water. Other terms used to describe protective colloids include "suspension agents," "stabilizing agents," "protective agents," "stabilizing colloids," etc., but the term "protective colloid" is believed more apt and to be in accordance with art accepted usage.

Historically, the inorganic protective colloid, bentonite clay, was probably first used for its protective colloidal value. The natural occurring organic protective colloids were, no doubt, next in chronology and include agaragar, Irish moss, gum arabic, albumen, gelatin, starch, alginates, etc., Casein and the vegetable proteins including corn protein and soya bean protein have been and are now extensively used in the emulsion paint art, though they appear to be losing some ground to the relatively recent synthetic hydrophilic protective colloids, one principal group of which include the water dispersible (colloidally water soluble) modified celluloses. Among this latter group and those preferred for the purposes of this invention are methyl cellulose, water soluble ether cellulose, methyl-ethyl cellulose, hydroxy ethyl cellulose, sodium cellulose glycollate, and carboxy methyl cellulose.

The preferred group includes methyl cellulose which contains between 1.2 and 1.9 methoxy groups per anhydroglucose unit; water soluble ethyl cellulose which contains between 0.8 and 1.3 ethoxy groups per glucose unit; and methyl-ethyl cellulose which contains from 0.3 to about 0.5 methoxy groups and 0.8 to 1.0 ethoxy groups per glucose unit. In the foregoing water soluble cellulose derivatives, a variety of viscosity grades are available and useful in the present invention. In general, the higher the viscosity grade, the less the original degradation of the cellulose molecule prior to etherification.

Still another class of protective colloids useful for the purposes of the present invention and now used to some extent in the latex emulsion paint art are water dispersible high polymer including as illustrative sodium polyacrylate, ammonium polyacrylate, etc.

In the first reductions to practice of the present invention as described in U.S. Serial No. 538,283 (of which this application is a continuation-in-part), aromatic solvents were used to reduce the viscosity of the epoxy varnishes which constituted the macroscopic disperse phase of the multicolor coatings of the invention. It was found that when aromatic solvents were so used, the water soluble alkyl cellulose ethers were the only protective colloids which allowed full and clean color development in the dried film of the macroscopic dispersed phase particles. However, it is known that the operable varnish resins need not always be reduced with aromatic solvents. Aliphatic solvents are useful in the case of many of the operable varnish resins, and with use of aliphatic solvents it is now both feasible and practical to use any one or combinations of more than one of the water dispersible protective colloids as heretofore described and as are commonly employed in the art of paint latex emulsion manufacture. Thus, by and through solvent control in the varnish, one may adapt to use in the present invention any one of the prior art protective colloids, albeit, some are more useful and preferred over others.

The amount of the protective colloid used is sufficient to prevent emulsion breakdown of the microscopic phase and the ranges of percentage lie between about 0.5% for sodium acrylate, for example, and something less than about 20% for the vegetable proteins by weight of the aqueous phase. Thus the quantity of protective colloid useful and essential will depend upon the quality of the protective colloid selected.

If one attempts to carry into combination a pigmented latex emulsion paint and macroscopic discrete particles of variously colored liquid hydrophobic varnish coatings as previously described in the suspension paint art to produce multicolor paint globules of hydrophobe color, said particles are rapidly reduced in size due to the combined action of the emulsifying agents and the protective colloids present in latex emulsion paints. It has been found that the quality of the viscid liquid hydrophobe of the macroscopic part of the coating must be selected to have a particular physical property for the invention to be operative.

When the added discrete particles are thus reduced in size below visibility to the naked eye, obvious heterogeneity of the system is lost and the desired color differences dissipated. This happens rapidly upon attempting to spray apply coatings not within the scope of this invention as from a spray gun. It is well known, for example, that pigments added directly to emulsion polymer latex systems cause aggregation of the emulsion particles and further reduction of the quantity of the protective colloid leads to emulsion polymer breakdown. Thus the presence of protective colloid is essential. In order to overcome breakdown of emulsions upon application, prior art emulsion paints employ dispersions of aqueous proteins as effective and efficient protective colloids. Anionic and non-ionic wetting of surface active agents; for example, sodium alkyl aryl sulfonates are illustrative of the first class and alkyl aryl polyoxyalkyline alcohols are illustrative of the second class; are also incorporated to obtain necessary emulsion paint stability.

As previously observed inorganic dispersants, such as the water soluble polyphosphates (usually present in latex emulsion paints), are a detrimental factor and interfere with maintenance of macroscopic color globules in suspension.

While it is not intended to be bound by theory, it is believed that the herein described alkyl cellulose ethers are unique among organic protective colloids in that they tend to decrease the surface tension of water less than most additives to aqueous solutions. While it is now reported that a 1% solution of methyl cellulose has a surface tension of 47–56 dynes, prior personal experience has indicated but little change in surface tension upon addition of methyl cellulose to pure water (e.g. 72 dynes/cm.). Most other organic protective colloids, in common use in water reducible emulsion paint systems, decrease surface tension and act of themselves as emulsifying agents as well as protective colloids. Thus, while the emulsion polymer systems carry into the coatings of this invention objectionable surface tension depressants and emulsifiers, the singular quality of water soluble alkyl cellulose ethers as a class tend to counterbalance rather than to assist adverse effects of the emulsifying agents used in emulsion polymerization (in which paint latices originate) and thus are a preferred class of protective colloids. Alkyl cellulose ethers permit macroscopic globules of hydrophobic coating compositions containing aromatic solvents to remain relatively constant in particle size in suspension in the system. Macroscopic color particles are visible in the bulk coating as well as in the films deposited from spray application. Further, water soluble alkyl celluloses described are effective to "protect" the paint latex polymer emulsion from emulsion breakdown upon pigment addition and upon freeze-thaw cycling.

EMULSION INTERPOLYMERS OR PAINT LATEX

A third essential component of the present invention is an emulsion interpolymer paint latex. For the purposes of the present invention all commercially available paint latices or latexes have been tried and found operable. All known paint latexes have been produced from ethylenically unsaturated monomers by emulsion polymerization techniques. The possible permutation and combination of ethylenically unsaturated monomers in combination as homopolymers, copolymers and terpolymers is legend. It is impossible to describe completely by purely chemical concept the scope of useful emulsion polymers as it is the physical behavior and quality of the emulsion polymers from ethylenically unsaturated monomers rather than their individual chemical constituents which separates the useful from the non-useful film-forming emulsion latices.

A straight polystyrene emulsion polymer is useful, for all intents and purposes, for practice of the present invention. It is not a desirable selection, however, for reasons which are outside the scope of the present invention combination. It is not desirable because of inferior films which it forms. Polystyrene emulsion homopolymers are operative to produce multicolor paints as is the object of the present invention. The paints so made are not desirable, however, as they lack other qualities which are sought for in a practical paint system which will continue to enjoy commercial acceptance. These factors, as indicated, are outside the scope of the present invention but of extremely practical significance in the selection of the paint latex.

Paint latices and latex emulsion polymers capable of depositing continuous stet films are an outgrowth of a study of the art of producing polymeric bodies from monomers of aromatic vinyl compounds having a single center of unsaturation (e.g., styrene) and conjugated diolefines (e.g., butadiene). The initial objective of study of emulsion polymerization was production of synthetic rubber in massive form. Original emulsion products intended as paint latices contained styrene and butadiene in reverse ratio or reverse proportion to the ratios used in massive synthetic rubber and for this reason are labeled as "reverse rubber" latices as a common term of reference. The preferred paint latices for the purposes of this invention are copolymers and terpolymers comprising monovinyl aromatic hydrocarbons and aliphatic conjugated diolefine containing not more than 67 mol percent of the monovinyl aromatic hydrocarbon and not more than 60 mol percent of the aliphatic conjugated diolefine. Terpolymers may include the lower alkyl acrylates, including methyl and ethyl acrylate monomers as well as vinylidene monomers, all of which are ethylenically unsaturated monomers, as starting materials in emulsion interpolymer formation.

While useful and preferred paint latices are found in the class just described, other homopolymers, copolymers and terpolymers in emulsion form useful as paint latices are in commercial production, commonly sold for use in emulsion paint systems and are more or less equivalent for the purposes of this invention. These emulsion polymers include vinyl acetate latex, vinyl acetate-vinyl alcohol emulsion copolymers, vinyl acetate-dibutyl maleate copolymers, homopolymers of methyl acrylate and ethyl acrylate, emulsion homopolymers of polybutadiene, etc. Illustrative U.S. patents describing paint latices include U.S. 2,536,470; 2,676,930; 2,498,712; 2,476,967; 2,683,-699; 2,683,700 and 2,771,456, which disclosures are included herein by reference as a part of the paint latex art.

As previously indicated, and in the light of the above, it can be seen that there is little correlation in setting forth the chemical names of monomers useful in producing paint latices by emulsion polymerization. However, the paint-useful emulsion polymers can be defined in relation to their physical qualities and properties, and in their method of manufacture.

Without exception the monomeric materials are polymerized in dispersed microscopic form in an aqueous carrier in the presence of surface active agents and polymerization promoting free radical catalysts. The dispersed phase interpolymer particles have molecular weights which are relatively large multiples of the molecular weight of the simple monomers from which they are formed or derived. The solids content (or nonvolatile) of the useful emulsion polymers is of the order of 50%. As far as has been known or ascertained all of these interpolymer solids are possessed of an HN requirement of more than 70 and less than about 90.

When spread out in thin films, either alone or in the presence of plasticizers and solvents incorporated into the emulsion system, and allowed to dry, the disperse polymeric phase preferably coalesces to form a continuous, coherent film possessed of such film integrity as to resist re-dispersive action of soap and water. Paint latices are further characterized by having film-forming and pigment binding quality. Such coherent films are herein referred to as stet films. A "stet" film is equivalent in general properties to the film resulting from paints and varnishes after solvent evaporation, oxidation and polymerization, or lacquers after evaporation of solvent. Straight polystyrene emulsions, for example, do not deposit stet films; for unless plasticized their films deposit out like beads and are lacking in cohesiveness and film integrity essential to paint usage.

The particle diameter of the disperse organic polymer phase is of microscopic order. Non-settling of the disperse phase is a universal quality. Unless specifically fortified by additives, or by extreme skill in formulating the emulsion copolymer, paint latices are susceptible to phase separation and emulsion breakdown upon repeated cycles of freezing and thawing. Additives are known which prevent coalescence due to this cause and are neither excluded from nor included in present considerations. (See U.S. Patents 2,683,699 and 2,683,700 for such additives.)

The term macroscopic as used herein is opposed to microscopic and refers to particles which are large enough to be seen without the aid of optical systems by one having normal vision. Macroscopic particles are intended to exclude the microscopic particles found in emulsion systems and include particles of at least 1/100 of an inch in diameter upwards. Particles at least as large as 1/4 of an inch in diameter are not uncommon. Useful pigmentary materials may be as small as 1 micron and not generally larger than will pass through a 325 mesh standard sieve. Thus they are of microscopic range of particle size.

The above exposition is intended to make clear the metes and bounds of paint latex materials useful and substantially equivalent to components herein specifically illustrated and described as essential. Many of the details of methods of preparation of the individual components of this invention are more fully described in the literature and are a part of the heritage of the art.

While it is believed that the scope and order of this invention has been made clear from the above description to accord with patent requirements, the following formulas and examples are included as exemplary of methods of reducing the invention to practice. All parts of the following examples are by weight unless otherwise stated.

*Example 1*

In a five liter flask equipped with heater, agitator, thermometer and reflex condenser heat 912 parts by weight of bis phenol and 465 parts by weight of epichlorohydrin to 150–160° F. Holding the temperatures relatively constant at this level, add 1600 parts 20% aqueous caustic soda slowly over a time period. Continue to hold the temperature at 150–160° F. for one hour after all the aqueous caustic has been added. Cut off the heat and recover the taffy colored mass from the aqueous phase which separate upon standing. The resinous mass is water washed until salt free and the occluded water present in the resin distilled off.

The HN value of the resin solids was determined to be above 105 (110) (not rechecked subsequent to the filing of the parent application). The resin when cut with a high Kauri-butanol value aromatic naphtha to 50% solids proved useful, when pigmented, as the macroscopic phase in the present composition. However, upon esterifying the resin, as in Example 2, with drying oil fatty acids over-all performance in paint systems of this invention were improved.

*Example 2*

60 parts of the resin of Example 1 were heated to 480° F. with 400 parts dehydrated castor fatty acids and held to an acid value of from 1–2. The resulting ester was cut to 50% solids with a high boiling naphtha having a Kauri-butanol value above 90. The HN of the solids was found to be 117. Later tests indicate a more accurate determination to be at a HN requirement of 51. The 117 value is now believed to be a secondary value and less accurate than obtained with repeated checks under more reproducible controls made subsequent to the filing of the parent application herein identified.

*Example 3*

450 parts by weight of the ester of Example 2
250 parts CaCO$_3$-silica pigment (Lorite)
20 parts molybdate orange
100 parts diatomaceous earth (Celite)
2¼ parts 4% lead drier
⅜ parts 6% cobalt drier
⅜ parts 6% manganese drier were mixed to a smooth paste and ground over a three roller mill. The mill output was thinned by addition of:

100 parts ester of Example 2
108 parts high flash naphtha of Kauri-butanol value of 90.

This formed a viscid hydrophobe pigmented varnish orange base useful as the macroscopic phase of the invention.

*Example 4*

Same as Example 3, but 5 parts of phthalocyanine green replaced the 20 parts of molybdate orange in the pigment.

*Example 5*

Same as Example 3, but 5 parts phthalocyanine blue replaced the 20 parts of molybdate orange.

*Example 6*

Into a change can mixer were weighed the following ingredients with continuous agitation of the mixer.

225 parts water
200 parts titanium dioxide
2 parts black iron oxide
25 parts CaCO$_3$-silica pigment (Lorite)

heat to 150° F. and add:

6 parts high gel methyl cellulose 4000 cps. grade and mix for 10–15 minutes. Add 225 parts ice water and cool to room temperature or below, add:

5 parts sulfonated tallow (antifoam agent)
2 parts sodium orthophenyl phenate
235 parts 45% emulsion copolymer solids latex of styrene and butadiene containing a major proportion of styrene
2 parts cobalt drier

*Example 7*

To 250 parts by weight of the base of Example 6 were added, while the base was being stirred slowly, 75 parts of the orange pigment paste of Example 3 and later and separately 25 parts of the blue paste of Example 5. Macroscopic particles of these colors were thereby suspended in visible or macroscopic globules in the emulsion base. Upon spraying out a sample of the composition with one pass of the spray gun, a grey base coat was deposited on the panel with a superimposed or interspersed spatter coat of visibly large particles of orange and blue paste, some of which particles were in juxtaposition relative to one another.

*Example 8*

Same as in Example 7, but the colors added were dispersed in a phenolic modified China-wood oil alkyd resin varnish whose solids were characterized by an HN value of 102. Upon attempting to spray out the coating, the macroscopic color particles emulsified into the aqueous phase and produced a panel devoid of varigated color pattern.

*Example 9*

Same as Example 7, but the black iron oxide pigment was replaced with 4 parts of a 50% phthalocyanine green pigment pulp in water and 1 part of ferrite yellow to produce a pale green base.

*Example 10*

To 250 parts of the aqueous base of Example 9 were added 50 parts of the hydrophobe varnish-pigment green base of Example 4. A pleasant spatter coat of dark green foreground globules and particles over a pale green solid substrate coat was obtained with but a single pass of the spray gun upon applying the resultant suspension in a thin film for coating purposes. The material dried to produce a washable film after overnight dry.

*Example 11*

Similar to Example 6, but the 235 parts of styrene-butadiene paint latex emulsion were replaced with 245 parts of 45% vehicle solids emulsion polymer of acrylonitrile (Rohm & Haas AC33). No difficulties were experienced, either in formulation or in application of the product upon stirring in representative amounts of the color bases of Examples 4 and 3. No appreciable emulsification of the macroscopic disperse phase occurred upon spray application. One pass of the gun upon spraying produced a base coat of solid color, over-layed with a visible spatter-pattern coating. The dried film had good washability after 48 hours of drying time.

*Example 12*

Same as Example 6, but the 235 parts of the styrene-butadiene emulsion copolymer were replaced with 205 parts of a polyvinyl acetate emulsion containing about 55% solids (National Starch 12–k–51). The base color emulsion was stirred, and while under agitation, representative amounts of the pigment paste of Example 4 were added. The mottled paint product did not emulsify in the spray gun in field tests. A satisfactory spatter coat, completely covering the test area, was obtained with but a single pass of the spray gun.

The above examples are believed to illustrate fully the practice of the invention as required; the following examples have been included to demonstrate the scope of the invention.

A large number of vehicles or varnishes in production by one of the world's largest paint manufacturers for a wide variety of end uses were selected for their variation in chemical constituency. These varnishes were tested to determine their HN values or HN requirements. The following examples illustrate specific ones of said varnishes whose HN requirement was determined, the HN value of the varnish solids and the operability of these viscid hydrophobe materials as the macroscopic phase forming vehicle when substituted for the ester of Example 2 in a formula similar to Example 3.

*Example 13*

135 parts of tall oil of an acid refined grade, 68 parts of black oil obtained from the alkali refining of linseed oil and 68 parts of Menhadden oil are heated to 370° F. to which and at this latter temperature 66 parts pentaerythritol and 3/8 part of litharge are added and dispersed in the hot oil. Thereafter the temperature is increased to 460° F. and held for alcoholysis. When alcoholysis has been substantially completed, cool to 420° F. and add 82 parts of phthalic anhydride. Re-heat to 460° F. and hold under a gentle inert gas blow to an acid value of from 10–20 and a viscosity of T (Gardner-Holdt) at 50% solids in mineral spirits. Cut with 385 parts of mineral spirits. Resulting product has an HN value of 54 or between 51 and 52 on the vehicle solids basis and is operable as thinned as the macroscopic varnish vehicle of the present invention.

*Example 14*

142 parts of alkali refined soya bean oil, 185 parts of black oil, 36¾ parts glycerin and 34¾ parts of pentaerythritol are heated to 400° F. ¼ part of litharge is added and the temperature held at 440° F. to completion of alcoholysis. (One hour, more or less.) 154 parts of phthalic anhydride are added and the varnish pill reheated to 460° F., which temperature is held while the forming varnish is maintained under an inert gas atmosphere and inert gas blow to an acid value of from 15 to 19. The varnish pill is reduced with 320 parts of mineral spirits after the viscosity of a test portion of vehicle has advanced to Y–Z viscosity at 60% solids when reduced with mineral spirits. The HN requirement of the varnish pill, or varnish solids, was 53–54. As the HN requirement of mineral spirits used as the solvent is 55, there is little difference between the HN requirement of the varnish solids and the thinned varnish.

*Example 15*

132½ parts of black oil, 90 parts fish oil and 22½ parts of glycerin were heated to 300° F., whereupon ¼ part of litharge and 46¾ parts pentaerythritol are added and the batch heated to 440° F. for alcoholysis. When alcoholysis has been completed, 126 parts phthalic anhydride are added and the batch heated to 430° F. and held under an inert gas blow and blanket to an acid value of 10–20 and a viscosity of at 50% solids with mineral spirits. When these conditions have been reached, the varnish is thinned with 390 parts of mineral spirits. The solids or non-volatile part of this varnish product has an HN number of 59. The varnish is illustrative of the critical limitation in the HN value for the purposes of this invention. This material is on the very borderline of operability as the macroscopic particles essential to the ends of the invention tend to emulsify in the test latex paint as described in Example 6. All other vehicles having a solids whose HN was above 59 and below 110 were inoperable for the purposes of the invention. Comparison is invited between this inoperative varnish with the operative varnish of Example 14.

*Example 16*

430 parts of mineral spirits are heated to 160° F. in a kettle equipped with an agitator. To the hot solvent is added 20 parts of rosin and 73 parts of selected gilsonite. After these resins have been dissolved 224 parts of blown Texas asphaltum are added. Agitation is continued until the varnish is free from undissolved particles. The product has a body from 70–110 viscosity on a No. 4 Ford cup at 42.5% solids with mineral spirits. The product has an HN number of 26 on 100% solids basis, as near as could be determined. (The intense black color made accurate determination difficult.) The product varnish was useful as the macroscopic disperse phase.

*Example 17*

170 parts of dehydrated castor fatty acid are heated to 250° F. at which time 85 parts of a glycidyl ether resin having an epoxide equivalent of from 870 to 1025 is added. The temperature is taken to 350° F. and 169 parts in addition of the same epoxy resin added to the contents of the kettle. The temperature is taken to 400° F. and 2½ parts of triphenyl phosphite are added. The temperature is increased to 470° F. and the batch held under an inert gas atmosphere with a mild blow for an acid value of 3 maximum. The viscosity is S–W Gardner when thinned to 50% solids. When these conditions are met, 406 parts of xylol are used to thin the batch after it has been appropriately cooled. The HN number of the solids of this material has been determined to have two values, namely 117 and 52. The second value, determined after a one month test, is believed to be the more accurate value and determination. The varnish was operable in the invention when tested in accordance with Example 6 and 7 procedures.

*Example 18*

A glycidyl ether resin having an epoxide equivalent of 450 to 525 was obtained from commercial sources. An HN requirement of the varnish solids material was found at a value of 130 (not rechecked since the filing of the parent application). The epoxide resin was useful for macroscopic particle development when tested in the manner of the immediately prior examples.

Example 19

777 parts linseed oil and 1.5 parts anthraquinone are heated to 300° F. 70 parts water white rosin and 5 parts fumaric acid are stirred in and the temperature taken to 370° F. After holding one and a half hours, 10.5 parts of pentaerythritol are added. The temperature of the batch is increased to 450° F. and held for one hour. The temperature is again increased to 550° F. whereupon an inert gas blow and blanket is maintained through and over the batch for a 300 second viscosity in a Gardner tube. The pill is cooled to 400° F. The Hydrophilic Number of the material at 100% solids is 54–55. Operable as macroscopic varnish phase as tested in the composition of the invention.

Example 20

85 parts of soya bean oil and 150 parts of refined tall oil and 117 parts linoleic acid are heated with 10 parts of maleic anhydride to a temperature of 350 to 400° F. and held for adduct formation. 90 parts of pentaerythritol are added at 400° F. and the temperature returned to 400° F. whereupon 103 parts phthalic anhydride are stirred into the reaction mass. The temperature is increased to 475° F. for 3 hours, then to 525° F. for a cure of 100 seconds. The temperature is dropped to 500° F. for a 75 second cure, then to 450° F. for a 60 second cure and an acid value of less than 12 (10–12). 28 parts of polyamide resin (dimer acid-ethylene diamine condensate) are then added and the temperature held at 450° F. to a cure of 50–55 seconds and an acid value of 8–10 or until 1 part of resin in 9 parts mineral spirits shows no graininess and the solution has maximum turbidity. The varnish is then thinned to about 40% solids with odorless mineral spirits. No HN value could be determined. The product was a gel-like material which prevented handling as in standard varnishes having less thixotropic quality. The product varnish was useful, in fact, very good for the purposes of the invention, however, when used to form the macroscopic disperse phase. (Made in accord with U.S. 2,663,649.)

Example 21

830 parts of China-wood oil and 831 parts of heat bodied linseed oil ($Z_2$ viscosity) are heated to 400° F. in one hour. After this time 900 parts of cumarone-indene resin are incorporated into the hot oil and the temperature raised to 480° F. This temperature is held for a body of J–K Gardner Holdt at 54% solids with 15% of high flash naphtha at 31% mineral spirits. When the stated body has been obtained at the solids indicated, 2638 parts of the same cumarone-indene resin are added and the temperature held at 450° F. for a D–F body at 54% solids thinned with high flash naphtha. The varnish pill is then dropped into a thinning tank and brought to 54% solids with a mixture of high flash naphtha and mineral spirits at a ratio of 15:30. The hydrophilic number on the resin solids is 56. The varnish was tested as the macroscopic phase of the multicolor emulsion paint of this invention, and as predicted from its HN value operated satisfactorily for the purposes of this invention.

The following examples are not fully described as to method of manufacture, but are included as illustrative of the lack of predictability of varnishes suitable for the present invention based upon their chemical classification. Usefulness of these varnish vehicles for the purposes of the present invention are predictable from their HN requirement values or numbers.

Example 22

A 100% solids fumaric-soya bean oil interester varnish containing 48% oil had an HN requirement of 71. Predicted inoperable from HN and was so found.

Example 23

A 45% China-wood oil, maleic anhydride modified alkyd varnish had an HN requirement of 102. Predicted inoperable. So found on test.

Example 24

A 58% soya bean oil alkyd had an HN number of 55–56 and was predicted to be operable. So found on test.

Example 25

A 51% soya bean oil-China-wood oil-phenol-aldehyde modified alkyd was found to have an HN value of 72. Predicted inoperable. So found on test.

Example 26

A 46% oiticica oil-linseed oil alkyd had an HN of 106. As this was very high it was somewhat uncertain. The material on test was found inoperative. A series of oiticica oil alkyds were made but none were operative, nor did any one of the said varnishes have an HN above 110 or less than 60.

Example 27

A 33% linseed-rosin modified alkyd varnish had an HN value of 104. Predicted inoperable. So found on test.

Example 28

A 37% dehydrated castor oil alkyd having an HN of 104 was predicted inoperable. So found on test.

Example 29

A 45% China-wood oil-maleic anhydride modified-phenolic modified alkyd had an HN requirement of 82. Predicted inoperative. So found on test.

Example 30

A 54% tall oil alkyd had an HN requirement of 63. Upon test the varnish vehicle was found inoperative for the purposes of this invention as the macroscopic disperse phase. This was in accordance with prediction from the HN requirement.

Example 31

A 31% fish oil alkyd modified with 35% styrene interpolymerized into the alkyd varnish had an HN value of 72. Predicted inoperative. Found inoperative.

Example 32

A 29% lauric acid modified alkyd varnish was found to have an HN value of the solids of 80. Predicted, inoperative: Found, inoperative.

Example 33

A glycidyl ether resin of commerce containing 225 to 290 epoxy equivalents (Shell-Epon 834) was found to have an HN of 53. Predicted operative: Found operative.

Example 34

A glycidyl ether resin of commerce having 450–525 epoxy equivalents had apparent HN values at 110 and 54, but a longer test period indicated the more accurate determination to be the HN 54 value. Predicted, operable: Found, operable.

Example 35

A soya fatty acid ester of a glycidyl ether resin had an original HN value after two weeks testing of 114. No HN determination was made later. The glycidyl ester varnish was predicted operable and so found.

(For record purposes, high flash naphtha has an HN of 57; toluene 65; 100% raw linseed oil 43; xylene 56; mineral spirits 55; odorless mineral spirits 47. These values should be useful to the art in making HN calculations from solvent-thinned varnish solids.)

Example 36

As noted, raw linseed oil has an HN value of 43. Predicted, operable: Found, operable.

Example 37

In the tests described above all the varnishes described were used to disperse ferrite yellow pigments which bases were incorporated in test paints where the vehicles were light in color, and dark iron oxide brown to pigment used in the darker colored varnishes. Tests were made by adding these bases to an emulsion paint product prepared in accordance with Example 6 and added in the manner of Example 7 and so tested.

Example 38

To demonstrate the universality of the emulsion polymer latices of commerce which are known to be produced from ethylenically unsaturated monomers, a series of purchases of pigmented white latex paints were made on the open market. Emulsion Latex Paint 1 was formulated with an acrylic emulsion polymer latex. Emulsion Latex Paint 2 was formulated with a polyvinyl acetate latex emulsion. Latex Paint 3 was formulated with a styrene-butadiene latex emulsion. Bases prepared in accordance with Examples 3 and 4 were added to the commercial latex paints by slowly stirring in the two colored bases one after the other. The products so produced sprayed out to produce a mottled coating in accordance with the objects of the invention.

Having described an advance in the art of decorative coatings, what I claim as my invention is:

1. A method of preparing a coating composition adapted to spray application to provide a washable solid base color and a plurality of interspersed discrete color particles in one pass of a spray gun, which comprises dispersing a pigment to form a slurry consisting essentially of pigment, water and water soluble protective colloid component, increasing the vehicle binder solids of said aqueous phase by addition thereto of an aqueous emulsion of a polymer prepared by polymerizing an ethylenically unsaturated monomer in an aqueous emulsion system the resultant polymer emulsion being capable of depositing a continuous stet film, and while slowly stirring said aqueous microscopic dispersion, separately suspending therein macroscopic particle size globules by the discrete addition to and slow agitation of said aqueous base with a pigmented liquid organic resinous varnish containing a non-volatile portion which is characterized by an Hydrophilic Number of about 26–59, the pigment in said varnish being of a color different from that of said pigment dispersed in said aqueous phase.

2. A method of preparing a coating composition adapted to spray application to provide a washable solid base color and a plurality of interspersed macroscopic discrete color particles therein in one pass of a spray gun, which comprises dispersing a pigment to form a slurry consisting essentially of pigment, water and a colloidally dispersed water soluble protective colloid component, increasing the vehicle binder solids of said aqueous phase slurry by addition thereto of an aqueous emulsion of a polymer prepared by polymerizing an ethylenically unsaturated monomer in an aqueous emulsion system said polymeric emulsion system being capable of depositing a continuous stet film, and while slowly stirring said aqueous microscopic dispersion separately suspending in the thus prepared pigmented latex emulsion paint, macroscopic particle size globules by the discrete addition of a plurality of differently colored water insoluble viscid liquid pigmented organic resinous varnishes, the non-volatile portion of which varnishes are each characterized by an Hydrophilic Number of about 26–59, and slowly agitating said first microscopic dispersion concurrently with said additions.

3. The method of preparing multicolor coating compositions adapted to spray application and to provide a washable solid base color and a plurality of interspersed macroscopic discrete color particles in said coating with one pass of a spray gun which comprises the steps of dispersing a pigment in an aqueous vehicle consisting essentially of water and a water soluble alkyl cellulose ether, increasing the binder solids of said pigmented aqueous phase by addition thereto of an aqueous emulsion of a polymer prepared by polymerizing an ethylenically unsaturated monomer in an aqueous emulsion system said resultant polymer emulsion system being capable of depositing a continuous stet film and while slowly stirring said aqueous microscopic dispersion separately suspending therein macroscopic particle size globules by the discrete addition of a plurality of pigmented water insoluble viscid liquid organic resinous varnishes, the non-volatile portions of which varnishes are each characterized by an Hydrophilic Number of about 26–59, and slowly agitating said first microscopic dispersion concurrently with said additions, said pigmented varnishes being of color different from each other and from said pigment dispersed in said aqueous vehicle.

4. A sprayable multicolor oil-in-water emulsion coating composition which comprises in combination a continuous aqueous phase containing a protective colloid therein and having suspended therein
   (a) a first dispersed phase comprising microscopic pigment particles and discrete microscopic emulsified particles of a polymer prepared by polymerizing an ethylenically unsaturated monomer, said resultant emulsion being capable of depositing a stet film upon drying, and
   (b) a second dispersed phase comprising macroscopic discrete particles of a pigmented water-insoluble, viscid, liquid organic resinous varnish, the non-volatile portion of which varnish is characterized by an Hydrophilic Number within the range of about 26–59 and 110–130, said pigmented varnish having a color different from the pigment of said first dispersed phase.

5. A sprayable multicolor oil-in-water emulsion coating composition which comprises in combination a continuous aqueous phase containing a protective colloid therein and having suspended therein
   (a) a first dispersed phase comprising microscopic pigment particles and discrete microscopic particles of a polymer prepared by polymerizing an ethylenically unsaturated monomer in an aqueous emulsion system, said resultant emulsion being capable of depositing a stet film upon drying, and
   (b) a second dispersed phase comprising macroscopic discrete particles of a pigmented, water-insoluble, viscid, liquid organic resinous varnish, the non-volatile portion of which varnish is characterized by an Hydrophilic Number of about 26–59, said pigmented varnish differing in color from the pigment of said first dispersed phase.

6. A coating composition of claim 5 in which said protective colloid is colloidally dispersed in said aqueous phase.

7. The product of claim 5, where the protective colloid is a water soluble alkyl cellulose ether.

8. The product of claim 7, where the water soluble alkyl cellulose ether is methyl cellulose.

9. The product of claim 7, where the water soluble alkyl cellulose ether is ethyl cellulose.

10. The product of claim 7, where the water soluble alkyl cellulose ether is a water soluble methyl-ethyl cellulose.

11. The product of claim 7, where the polymer is a copolymer prepared by polymerizing a mixture of ethylenically unsaturated monomers consisting essentially of a monounsaturated aromatic vinyl compound and a conjugated diolefine, wherein the former is present to an extent of not more than 67 mol percent and the latter is present to an extent of not more than 60 mol percent.

12. The product of claim 11, where the aromatic vinyl compound is styrene.

13. The product of claim 11, where the aromatic vinyl compound is styrene and the conjugated diolefine is butadiene.

14. The product of claim 11, where the aromatic vinyl compound is vinyl toluene.

15. The product of claim 7, where the polymer is an acrylate emulsion polymer.

16. The product of claim 7, wherein the polymer is a vinyl acetate homopolymer.

17. The product of claim 7, wherein the polymer is a vinyl acetate interpolymer.

18. The method of claim 2, wherein the alkyl cellulose ether is methyl cellulose.

19. The method of claim 2, where the alkyl cellulose ether is a water soluble ethyl cellulose.

20. The method of claim 2, where the alkyl cellulose ether is methyl-ethyl cellulose.

21. The method of claim 2, where the alkyl cellulose ether is hydroxy ethyl cellulose.

22. The method of claim 2, where the alkyl cellulose ether is an alkali cellulose glycollate.

23. The method of claim 2, where the aqueous emulsion comprises an interpolymer prepared from a monomeric mixture containing not more than about 67 mol percent of a monounsaturated aromatic vinyl compound and not more than about 60 mol percent of a conjugated diolefine.

24. The method of claim 2, wherein the pigmented liquid organic varnish comprises the drying oil fatty acid ester of a glycidyl polyether of a dihydric phenol free from functional groups other than epoxy and hydroxyl groups having a 1,2 epoxy equivalency greater than one, the non-volatile portion of said varnish being characterized by an Hydrophilic Number of about 26–59.

25. A water reducible multicolored spray coating composition which comprises in combination a continuous aqueous phase containing as the essential water soluble component an alkyl cellulose ether and a heterogeneous disperse phase; said disperse phase including a polymer prepared by polymerizing an ethylenically unsaturated monomer in an aqueous emulsion system, the resultant emulsion being capable of depositing a stet film upon drying, said polymer being in microscopic state of subdivision, a dispersed pigment of microscopic dimension and a macroscopic suspension of a colored, viscid, liquid hydrophobic drying oil fatty acid ester pigmented varnish comprising a glycidyl polyether of a dihydric phenol free from functional groups other than epoxy and hydroxyl groups having a 1,2-epoxy equivalent greater than one, the non-volatile portion of said varnish being characterized by an Hydrophilic Number of about 26–59, the color of said varnish being different from the color of said pigment dispersed in said aqueous phase.

26. The product of claim 25, where the alkyl cellulose ether is methyl cellulose.

27. The product of claim 25, where the polymer is a polyvinyl acetate.

28. The product of claim 25, where the emulsion polymer is a polymeric acrylonitrile.

29. The product of claim 25, where the emulsion polymer contains not more than 67 mol percent of a monounsaturated aromatic vinyl compound and not more than 60 mol percent of a conjugated diolefine.

30. A multicolor oil-in-water emulsion coating composition which comprises in combinatton an aqueous solution of a protective colloid as the continuous phase, a first disperse phase comprising microscopically suspended pigment particles and particles of a polymer prepared by polymerizing an ethylenically unsaturated monomer in an aqueous emulsion system, the resultant polymer emulsion being capable of depositing a stet film upon drying, a second disperse phase comprising macroscopic discrete particles of a water-insoluble, viscid, liquid, organic, resinous varnish, the non-volatile portion of which varnish is characterized by an Hydrophilic Number of about 26–59, said varnish being pigmented and having a color different from the pigment in said first phase.

References Cited in the file of this patent

UNITED STATES PATENTS

| | | |
|---|---|---|
| 2,563,991 | Damboise | Aug. 14, 1951 |
| 2,591,904 | Zola | Apr. 8, 1952 |
| 2,658,002 | Schwefsky | Nov. 3, 1953 |
| 2,709,689 | Herzog et al. | May 31, 1955 |
| 2,795,562 | Jud | June 11, 1957 |
| 2,802,799 | Johnson | Aug. 13, 1957 |
| 2,809,119 | Lesser | Oct. 8, 1957 |
| 2,811,459 | Wittcoff et al. | Oct. 29, 1957 |
| 2,828,222 | Kine | Mar. 25, 1958 |
| 2,837,444 | Hahn | June 3, 1958 |
| 2,865,871 | Johnson | Dec. 23, 1958 |